US012762055B2

(12) United States Patent
Boling

(10) Patent No.: US 12,762,055 B2
(45) **Date of Patent: *Oct. 13, 2026**

(54) OPTIMIZING SPACE AND TIME OF OPERATIONS FOR REGISTER CONFIGURATIONS

(71) Applicant: The Charles Stark Draper Laboratory, Inc., Cambridge, MA (US)

(72) Inventor: Eli Boling, Cambridge, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/212,561

(22) Filed: May 19, 2025

(65) Prior Publication Data

US 2025/0278362 A1 Sep. 4, 2025

Related U.S. Application Data

(63) Continuation of application No. 18/390,342, filed on Dec. 20, 2023, now Pat. No. 12,339,772.

(51) Int. Cl.
*G06F 12/06* (2006.01)

(52) U.S. Cl.
CPC .... *G06F 12/0653* (2013.01); *G06F 2212/251* (2013.01)

(58) Field of Classification Search
CPC ........... G06F 12/0653; G06F 2212/251; G06F 9/4411
USPC .......................................................... 711/170
See application file for complete search history.

(56) References Cited

U.S. PATENT DOCUMENTS

| | | | | |
|---|---|---|---|---|
| 6,256,713 | B1 * | 7/2001 | Audityan | G06F 13/18 711/E12.033 |
| 2004/0139281 | A1 * | 7/2004 | McDonald | G06F 12/0875 711/158 |
| 2008/0052688 | A1 * | 2/2008 | O'Brien | G06F 8/443 717/140 |

OTHER PUBLICATIONS

US Non-Final Office Action on U.S. Appl. No. 18/390,342 dated Sep. 23, 2024 (27 pages).
US Notice of Allowance on U.S. Appl. No. 18/390,342 dated Feb. 20, 2025.

* cited by examiner

*Primary Examiner* — Jared I Rutz
*Assistant Examiner* — Wei Ma
(74) *Attorney, Agent, or Firm* — Zachary Rimkunas

(57) ABSTRACT

Presented herein are systems and methods for configuring devices with write operations. One or more processors can identify a first sequence of write operations to configure a device. Each write operation in the first sequence of write operations can identify a set of a value and an address to which to write the value. The one or more processors can determine one or more distances between a set of the value and the address of a write operation and at least one other set of the value and the address of one or more other write operations in the first sequence of write operations. The one or more processors can generate a second sequence of write operations based at least on the one or more distances. The one or more processors can cause the device to be configured using the second sequence of write operations.

20 Claims, 6 Drawing Sheets

OPTIMIZING SPACE AND TIME OF OPERATIONS FOR REGISTER CONFIGURATIONS

CROSS-REFERENCE TO RELATED APPLICATION

This application is a continuation of and claims priority to and the benefit of U.S. patent application Ser. No. 18/390,342, titled "OPTIMIZING SPACE AND TIME OF OPERATIONS FOR REGISTER CONFIGURATION," filed on Dec. 20, 2023, the contents of all of which are hereby incorporated herein by reference in its entirety for all purposes.

BACKGROUND

In a computing environment, a set of instructions may be stored in memory or cache. A processor can read individual instructions from the memory to carry out various operations specified by the instructions.

SUMMARY

Aspects of the present disclosure are directed to systems, devices, methods, non-transitory computer readable media for configuring devices with write operations. One or more processors can identify a first sequence of write operations to configure a device. Each write operation in the first sequence of write operations can identify a set of a value and an address to which to write the value. The one or more processors can determine one or more distances between a set of the value and the address of a write operation and at least one other set of the value and the address of one or more other write operations in the first sequence of write operations. The one or more processors can generate a second sequence of write operations based at least on the one or more distances. The one or more processors can cause the device to be configured using the second sequence of write operations.

In some embodiments, the one or more processors can remove, from one of the first sequence or the second sequence of write operations, at least one of a subset of write operations identified as redundant based on the set of value and the address in each write operation of the subset. In some embodiments, the one or more processors can generate a mapping identifying an indexed value for each unique value across a plurality of values of the first sequence of write operations. The indexed value may have a lower number of bits than a number of bits for a corresponding unique value.

In some embodiments, the one or more processors can assign, to each write operation of the second sequence of write operations, a respective indexed value for a respective value of the corresponding write operation. In some embodiments, the one or more processors can provide, to be used for looking up during execution of the second sequence of write operations, a mapping identifying at least one of a correspondence between an indexed value and each unique value or a correspondence between an indexed address and each unique address.

In some embodiments, the one or more processors can assign, to each write operation of the second sequence of write operations, a respective indexed address based on a difference between the originally identified address and another address of write operation before to the corresponding write operation. In some embodiments, the one or more processors can determine a distance between the set of the value and the address of a write operation and another set of the value and the address of another write operation.

In some embodiments, the one or more processors can modify an order of the first sequence of write operations to minimize the one or more distances between the set of the value and the address of the write operation and the at least one other set of the value and the address of the one or more other write operations. In some embodiments, the one or more processors can apply an encoding to a configuration dataset including the second sequence of write operations to be provided to at least one register.

BRIEF DESCRIPTION OF THE DRAWINGS

The foregoing and other objects, aspects, features, and advantages of the present solution will become more apparent and better understood by referring to the following description taken in conjunction with the accompanying drawings, in which.

Figure 1A:
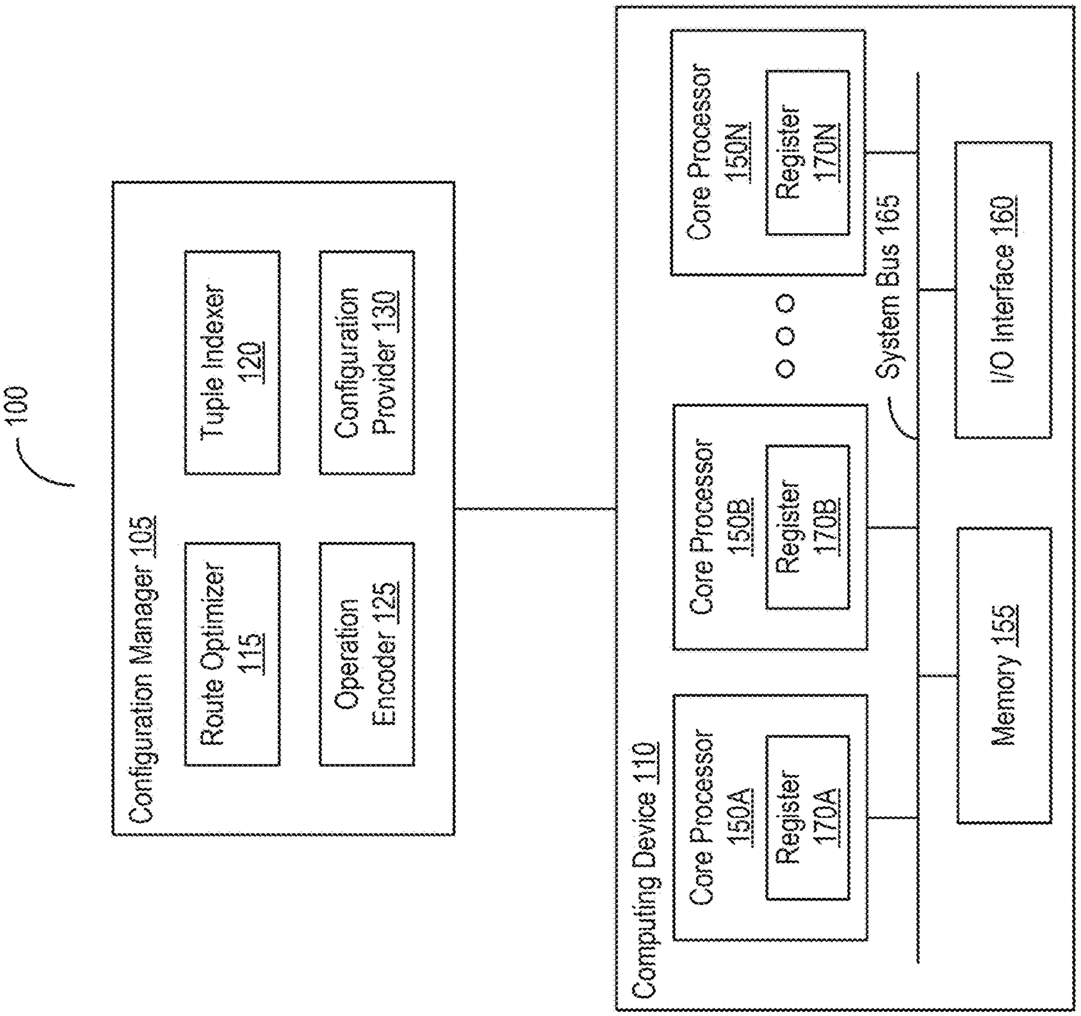
FIG. 1A depicts a block diagram of a system for configuring devices with write operations in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

A computing device may be configured through memory mapped registers in order to be able to perform its intended function. This configuration can be done through code, running on a central processing unit (CPU), to effectuate a series of stores of calculated values to different addresses on the device. Some computing hardware may entail a significant number of write operations to configure the hardware properly, and the data used in those writes may take up precious storage in certain small systems. Additionally, many write operations may take time to execute and time that may also be a precious resource at startup time of some dedicated hardware.

In addition, a large number of register store operations may be used to configure the computing device. In certain implementations, a device where tuples of register store operations comprising entries may be written to configure the device. In some cases, many of the values being written onto different addresses on the device are the same. For example, there may be a small number of different values being written to one or more registers, many times.

To address these and other technical challenges, both space taken by the configuration data and time to write configuration data may be optimized while factoring in constraints on hardware. In addition, very complicated compression schemes that might be challenging to implement in hardware may be avoided. The objective may be to construct a compact configuration stream which may be read by hardware or software to affect a series of register store operations to configure that hardware. Specialized support within the hardware may be used in some of the mitigation steps detailed herein. Various mixes of software and hardware techniques may be blended to address this problem. A combination of techniques may be composed altogether, or in parts to best fit different scenarios a device configuration may present.

When writing configuration sequences, it is sometimes the case that the same value may be specified to be stored, as part of a tuple of values, for example, multiple times in a row. The space for the configuration data may be reduced by ensuring on the hardware that the registers retain their previous value until re-written, and that for configuration tuples, there is a final commit register write to affect the entry. This may allow redundant writes to individual registers to be eliminated altogether from the stream of register store operations. This may have the added benefit of reducing the time required to configure the device, especially if the store operations are slow.

When the configuration includes tuples of write operations for multiple entries, finalized by some commit operation, careful planning of the ordering of those operations, coupled with the reduction of redundant stores technique, can further reduce the number of store operations required for configuration. The following may be, for example, a sequence of tuples, representing register values written at different device addresses:

(A B C)

(C B A)

(A C B)

In each tuple, the value at position 'n' may be written to register address 'n*4', for the purposes of illustration. So in the first tuple, 'A' may be written to address 0, 'B' to address 4, and so forth. If the sequence of value above were written, the following sequence of store operations may occur:

| Address | Value |
|---|---|
| 0 | A |
| 4 | B |
| 8 | C |
| 0 | C |
| 4 | B |
| 8 | A |
| 0 | A |
| 4 | C |
| 8 | B |

Note that in each of the nine operations above, a different value may be written to each register. If the order of the configuration entries is changed as follows, a different picture may emerge:

(A B C)

(A C B)

(C B A)

With the following sequence of store operations:

| Address | Value |
|---|---|
| 0 | A |
| 4 | B |
| 8 | C |
| 0 | A |
| 4 | C |
| 8 | B |
| 0 | C |
| 4 | B |
| 8 | A |

In the second sequence of store operations, the first and forth store may be redundant, and so the fourth store can be elided, reducing the total number of store operations required by one. In longer sequences of tuples, this effect may be stronger.

The selection of the best order of tuples may wind up reducing to the Travelling Salesman Problem. Considering two tuples, a distance statistic between the tuples can be calculated as the number of values in the tuples that are different, pairwise by position. This may represent how many register stores would be performed in order to 'move' between one tuple to the next. The tuples may be reordered, such that the total distance between the tuples in the solution is minimized. This process of selection, combined with the redundant store support in hardware, may further minimize the size of configuration data, and time required to configure the device.

To effect a commit operation, at least two options may be used. First, a separate register write for each tuple may be considered. However, it might be more optimal for an implementation to effect the commit of a tuple upon the store of the last entry in the tuple, eliminating the additional write to a separate commit register.

The values of each tuple in the sequence of operations may be indexed. When the total number of register store operations is high, and the total number of different values stored is low, encoding of the values as indices can be beneficial. In this optimization, all unique values to be written may be identified, and may be stored in a table at the front of the configuration stream. Entries within the configuration stream that specify address and value pairs to write are then encoded using indices into the table for the values, instead of the values themselves. For small numbers of unique 32-bit values this may often reduce the size of the value data by half or better. When processing the configuration stream, the values may be looked up from the table, and the resulting value may be written to a given address.

To provide support in the device itself to store tables of values, for the index values from the configuration stream may be allowed to be written directly to the device registers. This may result in additional time savings in the configuration process, as lookups can be deferred to the device, proper. Additionally, some values may be indexed, and some values may be within in the binary stream.

In addition, the memory addresses in each tuple in the sequence of operations may be indexed. If the total number of register store operations is large, and the total number of addresses written is small, then storing the register addresses as indices may be beneficial. In this optimization, the list of unique addresses may be culled from the configuration package, and stored in a table at the front of the package, and indices into that table may be stored in the configuration stream entries. When processing the configuration stream, the addresses may be looked up in the table to effect the store operations.

Furthermore, intermediate hardware that converts indices to addresses may be used, in the case where the list of addresses identified by any configuration package can be known in advance (e.g., be baked into the hardware). Such hardware may take an address index, and a value, lookup the address, and effect the store. This may allow the table of addresses to be omitted from the binary configuration stream, and for the lookup to be delegated to the downstream dedicated hardware.

For both addresses and values in the configuration stream, an unsigned little-endian base (ULEB) encoding can be used to reduce the space taken up in the configuration stream. This technique may be used, independent of whether indexed addresses or values are used. Each address and each value may be, for example, independently encoded using ULEB128 encoding.

In the case where indexed address encoding is not used, then an additional step of encoding addresses as a delta between the current address and the previous address may be performed. In the case where a device supports or requires repeatedly writing tuples of configuration registers, the choice of addresses on the device may be considered. The addresses for such sequences may be selected to be monotonically increasing, and closely packed, so that deltas between each address will be small, resulting in an optimal ULEB encoding for a sequence of writes.

In addition, on the backend of the aforementioned optimizations, Huffman encoding may also be applied to the binary configuration stream. Huffman decoders in hardware may be significantly less complex than heavier weight lossless decompression schemes. The application of Huffman encoding to a configuration stream after applying the above optimizations can reduce the size of the final binary image, for example, to within 11% of the compression that gzip at its highest level can obtain. The configuration information for devices may be compressed to a level that is far less complex than other compression techniques.

The write operations may be used to initialize and configure certain computing hardware, such as a computing device with a processor interlock (e.g., a processor interlock for policy enforcement PIPE)) and one or more core processors. The processor interlock can run in parallel with other processors on the computing device. An instance of the process interlock may monitor every instruction that the host processor executes, validating the correctness of the operation. The validation may be done in the context of metadata that is maintained for the host processor registers and memory, with the metadata being evaluated by a set of software defined rules. The base metadata and rules may be defined by a security policy that is programmed ahead of time.

Each memory word and register may have a programmable metadata tag. At every instruction, tags for the relevant memory and registers are passed to the processor interlock. An application processor may not directly create or modify tags. Tags can be pointers to arbitrary data structure, enabling complex policies. The processor interlock may run in parallel with application processor. The inputs to the processor lock may include metadata tags, which are evaluated against a defined policy. The processor interlock may generate an application processor interrupt if policy violation occurs. The processor interlock thus may create an unassailable hardware interlock blocking execution of bad instructions. The rule cache may keep performance high. Within the processor interlock, the policies may define what instructions are allowed and how metadata is updated. Policies may be written in a domain-specific rule language. The processor interlock may send metadata tags to policies running on the policy execution core. Policies may be used to check metadata against installed rules and reject improper behavior.

The processors on the computing device can read instructions from memory to load onto instruction register to be executed. The instructions may be associated with metadata (e.g., a tag) identifying a source and a destination of data and access control, among others. As the processors read and execute the instructions, the processor interlock can determine whether the instruction is in compliance with a security policy based in part on the metadata. In this computing environment, the processor interlock can be configured through a series of write operations to special function registers (SFRs) during a rule cache initialization. Additionally, initial tags for the application may be copied to memory (e.g., random access memory RAM) accessible by the processor interlock in the computing hardware. The SFR write operations fall into these categories: (1) a global configuration, (2) initial host register tag, (3) rule cache entry, and (4) a tag map table (entry) (TMT), among others.

The first two of these (e.g., global configuration and initial host register tag) may be constant in size. Tag map table entries may vary in number based on application requirements, but are not too numerous. Rule cache entries, however, can number in the hundreds, depending on policy mixes, and may have a substantial impact on initialization data size. Each tag map table entry may include five separate SFR write operations. For example, each rule cache entry may include twelve SFR writes. In certain implementations (e.g., a finite state machine for root of trust (RoT) PIPE initialization), each register can write in the initialization data is represented by 64 bits (e.g., a 32-bit SFR value and a 32-bit data value). Thus, each rule, in a worst-case situation, may involve 96 bytes of initialization data.

To gather representative data, a fault injection policy and a stack protection policy may be implemented, and the configuration data may be optimized with respect to their rule cache usage. For these two policies, an estimate of 216 rules in the rule cache may be estimated. The rule cache may be sized at 1024 lines, configured in four ways, for a total of 4096 possible rule cache entries. With 216 rules, the current worst case initialization data for the rules alone may be 20,736 bytes. For the purposes of the remaining analysis, the configuration package for configuration operations except the TMT entries may be instrumented.

Some of the SFR write operations for the configuration may be singleton writes. However, for the rule cache entries, write operations may hit a small set of registers repeatedly. In most cases, where the value written to an SFR matches the previous value, the redundant write operation may be not necessary. Two optimization steps may be therefore undertaken in the configuration generation tool. The first step may be to eliminate redundant writes. If, when generating a write operation to an address, the value may match the previous value written to that register, and the second write operation may be elided. The second optimization may be more complex.

When writing a rule, the twelve SFR writes that make up the rule may vary somewhat from rule to rule, depending on the policies. In many cases, there may be values shared between one rule and another. Ordering the rules properly, when installed, can minimize the total number of changes to SFR values across the entire collection of rules. Considering the number of the twelve SFR writes that are different from one rule to another, this may be taken as a representation of the distance from one rule to another. The objective may be to order the rules so that the total distance is minimized. There may be various algorithms (e.g., for Traveling Salesman Problem) for achieving varying degrees of optimization when solving this problem. Reasonable success can be found from applying the route finder.

Applying both of these optimizations to the existing initialization data, emitting the same 64-bit SFR address and value pairs as may be currently supported by the hardware resulted in a reduction of a total of 3081 SFR writes to 813 writes, or a reduction of nearly 75%. This may be a good result. Additional improvements may be made by optimizing the payload, not including the TMT configuration entries or the application tag data of 6504 bytes, which, depending on a one-time programmable (OTP) memory configuration may be too costly. Additional options may be investigated to reduce the size of the configuration payload in OTP.

Compression (e.g., gzip) may be used on the reduced binary configuration stream so as to provide ourselves with a sort of goal, or upper bound with additional encoding tricks. Several options can be explored for encoding the stream of register write operations that would be more friendly (to varying degrees) to implement in the hardware FSM. Four approaches may be used, which can be combined various ways to produce significantly smaller footprint of the configuration data in OTP: (1) indexed encoding of tag values, (2) indexed encoding of SFR addresses, (3) ULEB encoding of SFR write data (address and value), and (4) Huffman encoding of the payload, among others.

For any given set of policies, the total number of unique tags extent in the system may be relatively small. For example, for the 216 rules, there may be thirteen unique tags covering all allowable operations on the host, which appear in different combinations in the rules. Of the twelve SFR writes done when installing a rule, eight may be tag values. All of the host register tag writes may be tag values.

In this option, a count of tags may be written, plus all the unique tags to the front of the configuration data. Then whenever there is a tag value in an SFR write, the index of the tag value may be written in the array at the front of the configuration data. Since many of the SFR write values are not tags, the SFR write values may be distinguished between those with tags and without tags, so that the FSM can look up the indexed value at load time. SFR addresses may be always aligned, so the low bit is always zero in these. The SFR write pairs may be distinguished as needing a lookup by in a “1” to the SFR address.

There may be a fairly limited number of SFR addresses that are written during the configuration process. In the payload analyzed here, the total number of SFR addresses written may be limited to 38. TMT entries may add more, but the number of unique SFR addresses may not increase as more rules are added. Using indices to refer to them may allow for significant reduction in payload size.

The encoding for indexed SFR addresses may be a little more complicated than the indexed encoding for tags. The tools may capture unique addresses written to during the configuration payload build, allocating indexes for them. Then a count of the addresses followed by the array of addresses may be written to the front of the payload. To reduce the number of total addresses written in the array, an additional special encoding may be applied. In some cases, a series of write operations may be performed done to monotonically increasing SFR addresses. For example, when writing host register initial tags, there may be 32 writes to successive addresses. Rather than include each address in the array, two indices, 0 and 1, may be reserved to indicate that the address is the last address written to, incremented by 4 or 8 bytes, respectively.

Lastly, if this optimization is composed with the indexed tags optimization, the LSB of the address may be kept out of the way, to support the use of that to indicate conditional indexed tag presence in an SFR write. To do this, the SFR address index may be shifted left by 1 bit. Therefore, the algorithm when reading an indexed address is: (1) read the raw index, and (2) shift the index right one bit. If the result is 0, add 4 to the last address written, and use that. If the result is 1, add 8 to the last address written, and use that. Otherwise, the value may be used to index into the SFR address array at the front of the payload, and the resulting address may be used as the SFR address to write to.

Independent of the above two optimizations, ULEB encoding may be applied on both the SFR address and value. This may be done after either or both index optimizations are applied. ULEB encoding may help with any SFR values that are not index values (e.g., not tags). Significant benefits may accrue if one or both of the previous optimizations are not done.

If the SFR address optimization is not done and ULEB encoding is applied, one additional step may be performed on SFR address encoding. The previous address written and on write operation may be tracked, the delta between the current address and the previous address may be calculated, and ULEB encoding may be applied to the delta. Write operations may be, as much as possible, ordered so as to be monotonically increasing so as to maximize the benefit from this technique. Thus, the twelve SFR writes for a rule, for example, may be all ordered such that each address written is greater than the previous address, resulting in small delta values that behave well under ULEB encoding.

Finally, experiments may be run with applying Huffman encoding to the payload. The SFR address and value entries may be encoded, leaving the SFR address and tag index arrays in raw form, to allow for the array to be addressed directly out of OTP by the FSM. Huffman encoding may represent probably the most complicated piece to implement in hardware, but may be significantly better than implementing other compression schemes.

The configurations may be generated with various combinations of the above optimizations. The results may be tabulated below. All sizes may be in bytes. The total columns may represent the totals of the indexed SFR addresses, if present, the indexed tags, if present, and the configuration payload. Huffman encoding may be applied after all other optimizations so numbers with and without Huffman are presented in distinct columns.

| Optimizations | Raw Size | With Huffman | Total (Raw) | Total (Huffman) |
|---|---|---|---|---|
| None | 6504 | 3057 | 6504 | 3057 |
| Indexed Addrs | 6504 | 2596 | 6660 | 2752 |
| Indexed Tags | 6504 | 2270 | 6564 | 2330 |
| ULEB | 4299 | 2874 | 4299 | 2874 |
| ULEB, indexed addrs | 3127 | 2214 | 3283 | 2370 |
| ULEB, indexed tags | 3159 | 2002 | 3219 | 2062 |
| ULEB, indexed addrs & tags | 2019 | 1312 | 2235 | 1528 |

Referring now to FIG. 1A, depicted is a block diagram of a computing environment or system 100 for configuring devices with write operations. In overview, the system 100 can include at least one configuration manager 105 and at least one computing device 110, among others. The configuration manager 105 can include at least one route optimizer 115, at least one tuple indexer 120, at least one operation encoder 125, and at least one configuration provider 130, among others. The computing device 110 can include one or more core processors 150A-N (hereinafter generally referred to as processor 150), at least one memory 155, and at least one input/output (I/O) interface 160, among other, coupled with one another via at least one system bus 165.

The memory 155 may include volatile memory (e.g., random access memory (RAM)), non-volatile memory (e.g., read-only memory (ROM), hard disk drives (HDDs) or other magnetic or optical storage media, solid state drives (SSDs), such as a flash drive or other solid state storage media, hybrid magnetic and solid state drives), or virtual storage volumes, such as a cloud storage, or a combination of such physical storage volumes and virtual storage volumes or arrays thereof, among others. In some embodiments, the memory 155 can be one-time programmable (OTP) memory. The OTP memory can include one or more instructions for the initialization of the computing device 110.

The I/O interface 160 may include at least one graphical user interface (GUI) (e.g., a touchscreen, a display, etc.), at least one I/O device (e.g., a mouse, a keyboard, a microphone, speakers, a camera, a biometric scanner, an environmental sensor, an accelerometers), among others. The I/O interface 160 may also include interfaces to enable the system 1200 to access a computer network such as a Local Area Network (LAN), a Wide Area Network (WAN), a Personal Area Network (PAN), or the Internet through a variety of wired and/or wireless or cellular connections, among others.

The system bus 165 can be a communication pathway over which one or more components of the computing device 110 can exchange instructions, payload, and other data. The system bus 165 can include at least one address bus for carrying memory addresses between the processor 150 and the memory 155, at least one data bus to exchange data among the processor 150, the memory 115, and the I/O interface 160, and at least one control bus to convey commands from the processor 150 to other components within the computing device 110, among others.

The configuration manager 105 and each core processor 150 may be implemented by one or more programmable processors to execute one or more executable instructions, such as a computer program, to perform the functions of the system. The processors may include circuitry that performs a function, an operation, or a sequence of operations (e.g., as embodied in the route optimizer 115, the tuple indexer 120, the operation encoder 125, the configuration provider 130, and other instructions stored on memory). The function, operation, or sequence of operations may be hard coded into the circuitry or soft coded by way of instructions held in a memory device and executed by the circuitry. The processor may perform the function, operation, or sequence of operations using digital values or using analog signals.

In some embodiments, the processor used to implement the configuration manager 105 or the core processors 150 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The processor may be analog, digital or mixed-signal. In some embodiments, the processor may be one or more physical processors or one or more "virtual" (e.g., remotely located or "cloud") processors. The processor including multiple processor cores or multiple processors multiple processors may provide functionality for parallel, simultaneous execution of instructions or for parallel, simultaneous execution of one instruction on more than one piece of data.

The configuration manager 105 can correspond to or include one or more processors and memory to execute the route optimizer 115, the tuple indexer 120, the operation encoder 125, and the configuration provider 130, among others. On the configuration manager 105, the route optimizer 115 can modify a sequence of operations to be executed by the computing device 110 by reducing a space to store the operations and an amount of time to execute the operations. The tuple indexer 120 can generate index values and memory addresses to replace the original index values and memory addresses in the sequence of operations. The operation encoder 125 can apply an encoding to a configuration dataset to be provided to the computing device 110. The configuration provider 130 can configure the computing device 150 with the configuration dataset. In the core processor 150 of the computing device 110, register 170 can include or correspond to at least one register to store, buffer, or otherwise hold the instruction that is currently executed by the core processor 110. In some embodiments, the register 170 can be a special function register to control one or more hardware functionalities, such as a subroutine return address, processor status, condition codes, I/O, peripheral control, timer, stack pointer, stack limit, and program counter, among others.

The configuration manager 105 can be executed from processors across one or more computing systems. In some embodiments, at least a portion of the configuration manager 105 can be part of the computing device 110 (e.g., as part of the core processor 150 and memory 155). For instance, the configuration manager 105 can be executed from one or more of the core processors 150 and can be used to provide a modified sequence of operations to another core processor 150 for execution. In some embodiments, the configuration manager 105 can be separate from the computing device 110, and be communicatively coupled with the computing device 110 (e.g., via the I/O interface 160). For example, the configuration manager 105 can be executed from a separate computing device, and communicate the configuration stream containing the modified sequence of operations, via one or more networks. In some embodiments, the configuration manager 105 can be executed from one or more of the core processors 150 provide the configuration stream containing the modified sequence of operations to another core processor 150 from non-volatile storage.

Figure 1B:
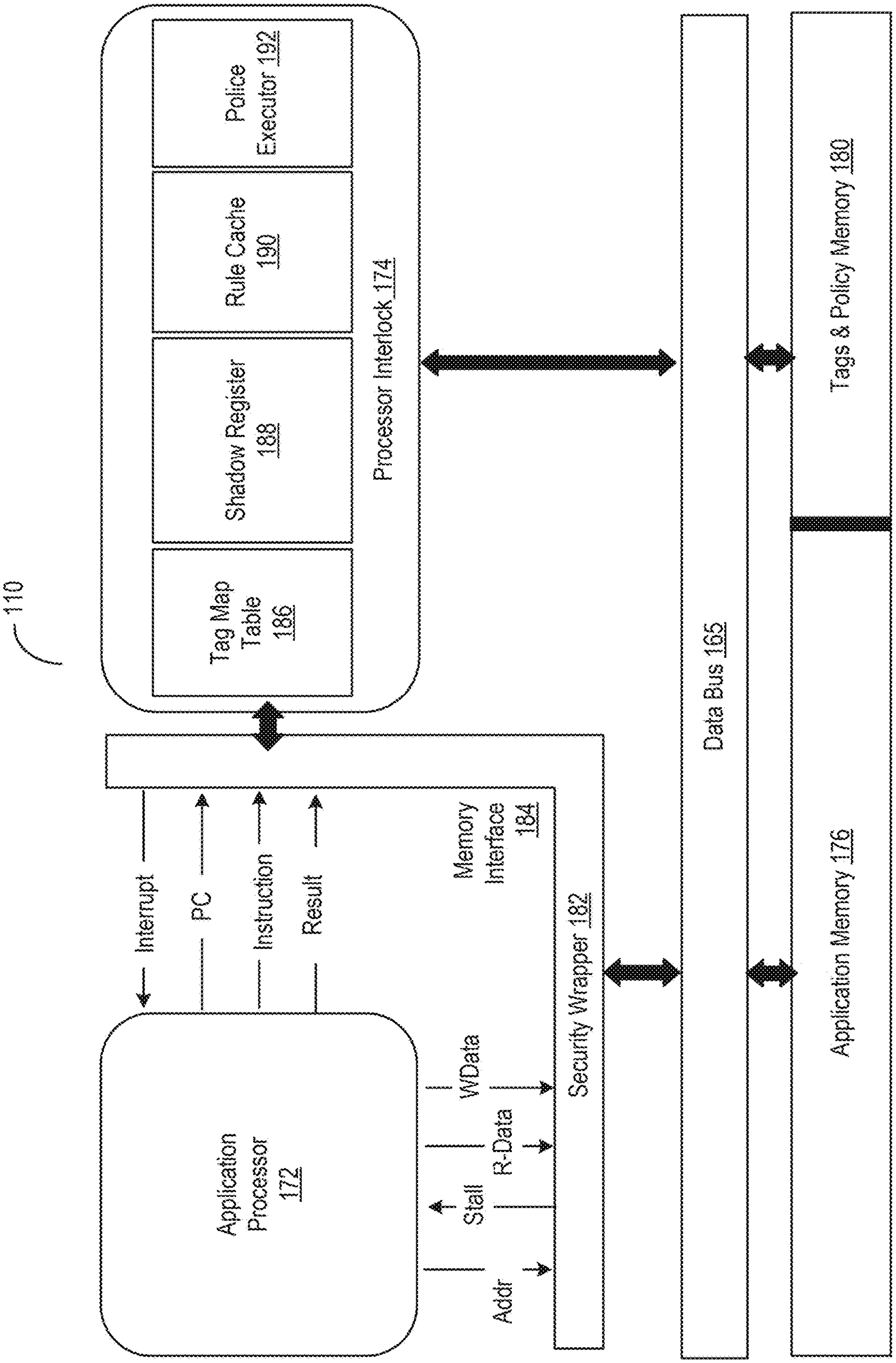
FIG. 1B depicts a block diagram of a computing device with process interlocks to enforce security policies in accordance with an illustrative embodiment.

Referring now to FIG. 1B, depicted is a block diagram of the computing device 110 with process interlocks to enforce security policies. The computing device 110 may include at least one application processor 172, at least one processor interlock 174, at least one application memory 176, at least one policy memory 180, at least one security wrapper 182, at least one memory interface 184, and the database 165, among others. The processor interlock 174 may include at least one tag map table 186, at least one shadow register 188, a rule cache 190, and at least one policy executor 192, among others. In some embodiments, at least one of the processors 150 configured with the security policy can operate as the processor interlock 174 (e.g., PIPE) to inspect execution of instructions by concurrently running application processors 172 for security compliance. At least one of the processors 150 can be used as the application process 172 to read instructions via the security wrapper 182 and the memory interface 184.

The processor interlock 174 may maintain a set of shadow registers 188 for the application processor 172 registers. The shadow registers 188 may not hold the processor specific values, but instead software defined metadata (tags) for those shadow registers 188. The initial state for these tags may be determined by the security policy, and may be programmed into the processor interlock 174 before the application processor 172 begins execution.

The tag map table 186 may provide a mapping from application memory regions 176 to tag memory regions 180 accessible only by the processor interlock 174. The tag memory regions 180 may contain the metadata values for each application processor accessible address on the application memory 176. The tag map table 186 may provide a flexible mapping scheme, allowing for various granularities of coverage of tags to application memory regions 176. The initial tags for the host memory may be defined by the security policy, and by tools that pre-process any host application to be run on the application processor 172, and those tags may be written to the tag memory prior to the application processor 172 starting execution.

When the application processor 172 executes an instruction, a trace from the instruction may be sent to the processor interlock 174 for validation. The trace may include the current program counter, the physical address of the instruction, and any physical memory address the instruction may be accessing, among others. The trace may also include the actual bits of the instruction. In some embodiments, the trace may also be fetched by the processor interlock 174 using the instruction address as needed.

The processor interlock 174 may first decode the host instruction to determine the type of instruction (e.g. ALU, LOAD, STORE or BRANCH operation), along with any inputs and outputs it may take. For any register operands to the instruction, the processor interlock 174 may fetch metadata for the register. For any memory address accessed by the instruction, the processor interlock 174 may consult the tag map table 186 to find a mapping from host memory 176 to tag memory 180 for that address and may fetch the tag for the memory address from the tag memory 180.

The resulting type, or shape, of the instruction, along with all inputs may then be looked up the rule cache 190 at the processor interlock 174. The rule cache 190 may hold a set of mappings from allowable inputs to sets of output tag values given those inputs. The rules may be defined as part of the security policy that is used to configure the processor interlock 174. If the processor interlock 174 finds a rule in the cache 190, the processor interlock 174 may use the output values of that rule to update the tags on the output registers of the instruction, as well as any memory the instruction may have accessed.

If a rule is not found in the cache 190, then the processor interlock 174 may consult the adjoined policy executor 192, providing the policy executor 192 with the input values it has calculated. The policy executor 192 may then determine a valid output rule and install the output rule in the rule cache 190 of the processor interlock 174. The processor interlock 174 may then continue processing of the outputs. If no rule is found, and the processor executor 192 cannot determine a valid output, then this may be deemed a policy violation. As a result, the application processor 172 may be stalled by the processor interlock 174, and a violation signal may be raised to indicate the security violation.

The initial configuration of the processor interlock 174, including the initial register tags, the configuration of the tag map table 186, initial rules in the rule cache 190 may be done via writes to special function registers (SFRs) of the processor interlock 174. This may be done either by the policy executor 192, by dedicated hardware, or in some cases, by the host application 172. The same process that initializes the processor interlock 174 may also write the initial tags for memory addressed by the tag map table 186.

Figure 2:
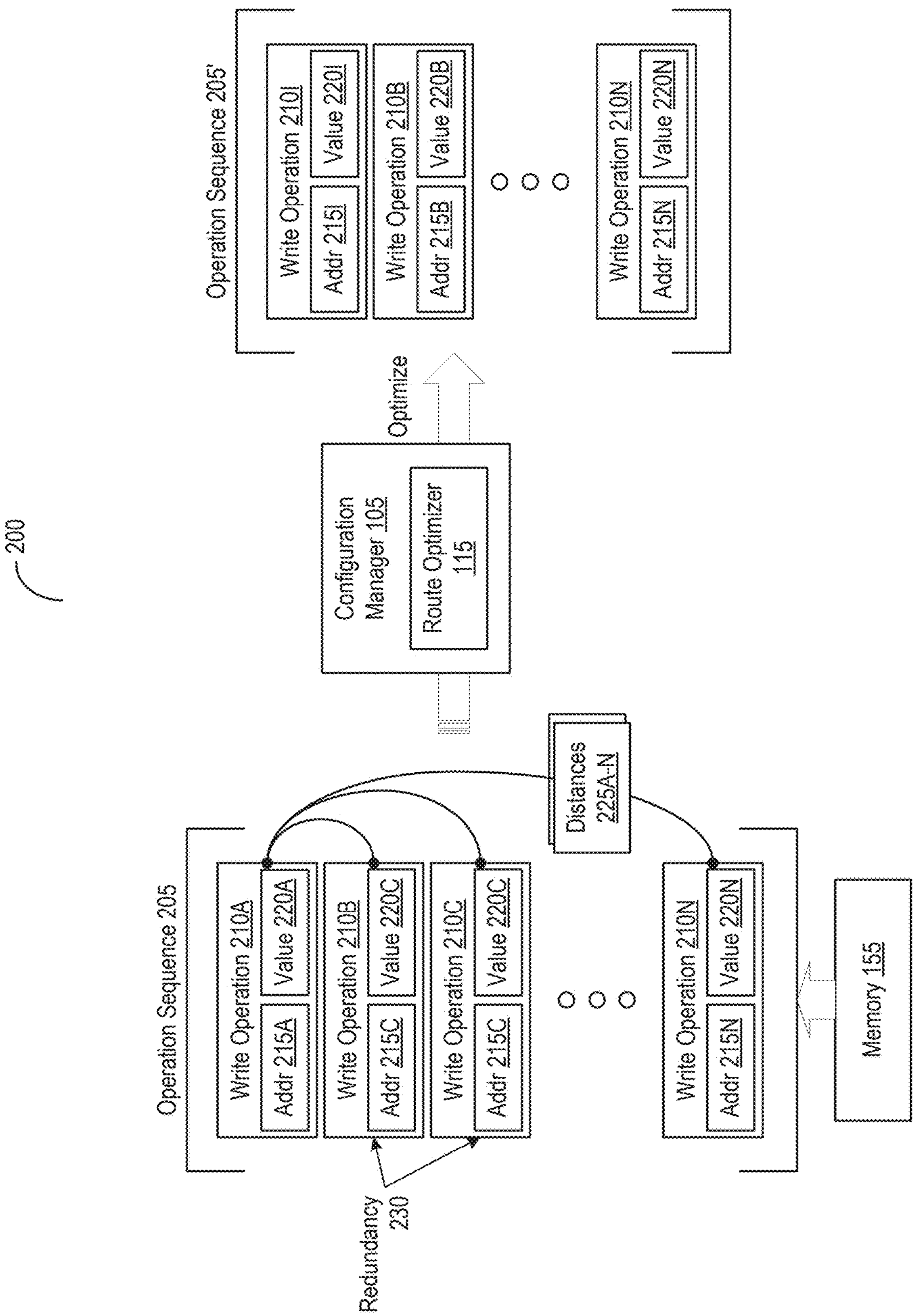
FIG. 2 depicts a block diagram of a process for optimizing sequences of operations in the system for configuring devices in accordance with an illustrative embodiment.

Referring now to FIG. 2, depicted is a block diagram of a process 200 for optimizing sequences of operations in the system 100 for configuring devices. The process 200 can correspond to or include operations performed in the system 100 to optimize sequences of operations by space for storage and an amount of time for execution. Under the process 200, the route optimizer 115 on the configuration manager 105 can receive, obtain, or otherwise identify at least one operation sequence 205 (sometimes herein referred to as a first sequence of operations). In some embodiments, the route optimizer 115 can interface with or access the memory 155 (or cache in one or more processors 110) of the computing device 110 to fetch or retrieve the operation sequence 205. For example, the route optimizer 115 can access one-time programmable (OTP) memory holding the operation sequence 205 for retrieval and modification.

The operation sequence 205 can contain, identify, or otherwise include a set of write operations 210A-N (hereinafter generally referred to as write operations 210. The operation sequence 205 can define or specify an order in which the write operations 210 are to be performed by one or more of the processors 150 on the computing device 110. Each write operation 210 can define, include, or otherwise identify a set of at least one address 215A-N (hereinafter generally referred to as an address 215) and at least one value 220A-N (hereinafter generally referred to as a value 220. The address 215 can point to, reference, or otherwise identify a location within memory (e.g., the memory 155) to which to write the value 220. The value 220 can define, identify, or otherwise include data to be written or stored on the location within the memory identified by the address 215. In each write operation 210, the address 215 and the value 220 can form a set (sometimes herein referred to as a pair or a tuple).

In some embodiments, the write operations 210 of the operation sequence 205 can define or specify one or more operations that are to be performed upon initialization (e.g., booting up) of the computing device 110. In some embodiments, the operation sequence 205 can define, specify, or identify a set of rules to configure a security policy on at least one of the processors 150 of the computing device 110. The set of rules can correspond to the set of write operations 210 in the operation sequence 205. For example, the rules for the write operations 210 can be for a special function register (SFR) on the at least one of the core processors 150 in the computing device 110. In some embodiments, the rules may be security policies used to carry out processes of the processor interlock 174 as detailed herein. The rules can include, for instance: a global configuration operation to set one or more values to apply to multiple functions on components in the computing device 110; a host register operation to store data or tags on a specified register within the computing device 110; and a rule cache entry corresponding to writing initialization data among others. Each rule can correspond to one or more write operations 210 in the operation sequence 205. With the identification of the operation sequence 205, the route optimizer 115 can calculate, generate, or otherwise determine one or more distances 225A-N (hereinafter generally referred to as distances 225). The one or more distances 225 can be between one set of the address 215 and the value 220 in a write operation 210 (e.g., the write operation 210A) and at least one other set of the address 215 and the value 220 in one or more other write operations 210 (e.g., the write operations 210B-210N) in the operation sequence 205. Each distance 225 can define, identify, or otherwise correspond to a degree of difference between one write operation 210 (e.g., the write operation 210A) and another write operation (e.g., the write operations 210B). For each write operation 210, the route optimizer 115 can determine the degree of difference of the set of the address 215 and the value 220 for the write operation 210 and the set of the address 215 and the value 220 of each of the other write operations 210. For instance, for the write operation 210A, the route optimizer 115 can determine the distance 225A between the write operation 210A itself and the write operation 210B, the distance 225B between the write operation 210A and the write operation 210C, and so forth.

The distance 225 can correspond to an amount of difference among the write operations 210, in terms of the difference in addresses 215 or the values 220, or both. In some embodiments, the distance 225 can correspond to an amount of difference between the value 220 in one write operation 210 versus the value 220 in another write operation 210. In some embodiments, the distance 225 can correspond to an amount of difference between the address 215 in one write operation 210 versus the address 215 in another write operation 210. In some embodiments, the distance 225 can correspond to a degree of difference between a representative value corresponding to the set of the address 215 and the value 220 in one write operation 210 relative to another representative value corresponding to the set of the address 215 and the value 220 in another write operation 210.

In some embodiments, the route optimizer 115 can determine the distance 225 to correspond or identify a number of operations where a different value 220 is being stored to a particular address 215 among the set of write operations 210, such as between one write operation 210 to the other write operation 210. The distance 225 can be determined as a function of the address 215 or the value 220 (or both) in one write operation 210 and the address 215 or the value 220 (or both) in another write operation 210. The function can be to count the number of different values 220 stored to each address 215 among a set of write operations. For example, the register 170 may be specified to write the values 220 at the corresponding specified addresses 215 over and over in accordance with the operation sequence 205:

| Address | Value |
|---|---|
| 0 | A |
| 4 | B |
| 8 | C |
| 0 | A |
| 4 | C |
| 8 | B |

The first value can first go to address 0, the second to address 4, the third to address 8, and then repeated for the values in the next tuple. In the example above, the distance 225 may be determined to be 2: The second tuple can store the same value (A) to address 0, but the values written to addresses 4 and 8 may be different from the values written to the corresponding address by the first tuple.

In addition, the route optimizer 115 can find, determine, or otherwise identify at least one redundancy 230 among a subset of write operations 210 in the operation sequence 205. The redundancy 230 can correspond to two or more write operations 210 in which the same value 220 is to be written on the same location in memory as identified by the same address 215. In the depicted example, the write operation 210B and the write operation 210C can be identified as forming the redundancy 230, for having the same address 215C and value 220C. To identify, the route optimizer 115 can determine or identify unique values 220 across the write operations 210 in the operation sequence 210. For each unique value 220, the route optimizer 210 can determine whether multiple write operations 210 having the unique value 220 identify or include the same address 215. For example, the unique value 220 of "A", the route optimizers can determine whether there are multiple write operations 210 containing the value "A") with the same address of "1." If multiple write operations 210 are not found, the route optimizer 210 can determine that no redundancy 230 exists in the operation sequence 205 for the value 220. On the other hand, if multiple write operations 210 are found, the route optimizer 210 can identify the subset of write operations 210 with the same value 220 and address 215 as redundant (e.g., corresponding to the redundancy 230).

With the determination of the distances 225 or the identification of the redundancy 230 (or both), the route optimizer 115 can produce, create, or otherwise generate at least one operation sequence 205' by modifying the original operation sequence 205. Based on the distance 225, the route optimizer 115 can set, change, or otherwise modify the order of the original operation sequence 205 to generate the operation sequence 205'. In some embodiments, the route optimizer 115 can modify the order of the operation sequence 205 to optimize (e.g., minimize) the one or more distances 225 between the one set of the address 215 and the value 220 in a write operation 210 and at least one other set of the address 215 and the value 220 in one or more other write operations 210. For example, the route optimizer 115 can determine the order for the new operation sequence 205', such that the total distance between consecutive, successive write operations 210 is at the minimum. The optimization in accordance with the distances 225 can re-order the set of write operations 210 in the original operation sequence 205 to generate a new, different order of the set of write operations 210 for the new operation sequence 205'. As a result of the reordering, the resultant operation sequence 205' can contain, identify, or include write operations 210 in an order different from the order of the set of write operations 210 in the original sequence 205. For instance, as depicted, the operation sequence 205' can include the write operation 210I at a first position, instead of the write operation 210A as in the original sequence 205.

Using the identification of the redundancy 230, the route optimizer 115 can exclude, delete, or otherwise remove at least one write operation 210 from the subset of write operations 210 identified as redundant from the overall set of write operations 210. In some embodiments, the route optimizer 115 can combine, aggregate, or otherwise elide the subset of write operations 210 identified as redundant into a single write operation 210. The elided write operation 210 can identify or include the same address 215 and the same value 220 as the subset of write operations 210 identified as redundant (e.g., corresponding to the redundancy 230. As a result of the elision, the resultant operation sequence 205' may contain, identify, or include fewer write operations 210 than the original operation sequence 205. For example, as depicted, the route optimizer 115 can remove or elide the write operation 210C determined to be redundant with the write operation 210B for having the same address 215 and same value 220. With the removal, the route optimizer 115 can form the new, modified operation sequence 205'. The route optimizer 115 can store and maintain the operation sequence 205' on storage (e.g., the memory 155 or cache).

The reordering and the elision can be performed by the route optimizer 115 in any sequence. In some embodiments, the route optimizer 115 can perform the elision prior to the re-ordering of the set of write operations 210. For example, the route optimizer 115 can combine one or more subsets of write operations 210 identified as redundant without one another without each subset from the original operation sequence 205'. With the elision of the redundant write operations 210, the route optimizer 115 can determine the one or more distances 225 among the remaining write operations 210, and use the distances 225 to reorder the write operations 210 to generate the modified operation sequence 205'.

In some embodiments, the route optimizer 115 can perform the re-ordering prior to the elision of the set of write operations 210. For instance, the route optimizer 115 can determine the one or more distances 225 among the write operations 210 in the original operation sequence 205. With the determination, the route optimizer 115 can re-order the write operations 210 in accordance with the distances 225. From the re-ordered set of write operations 210, the route optimizer 115 can identify one or more subsets of write operations 210 as redundant for having the same addresses 215 and values 220. Upon identification, the route optimizer 115 can elide each subset of write operations 210 into a single write operation 210 to form the operation sequence 205'.

Figure 3:
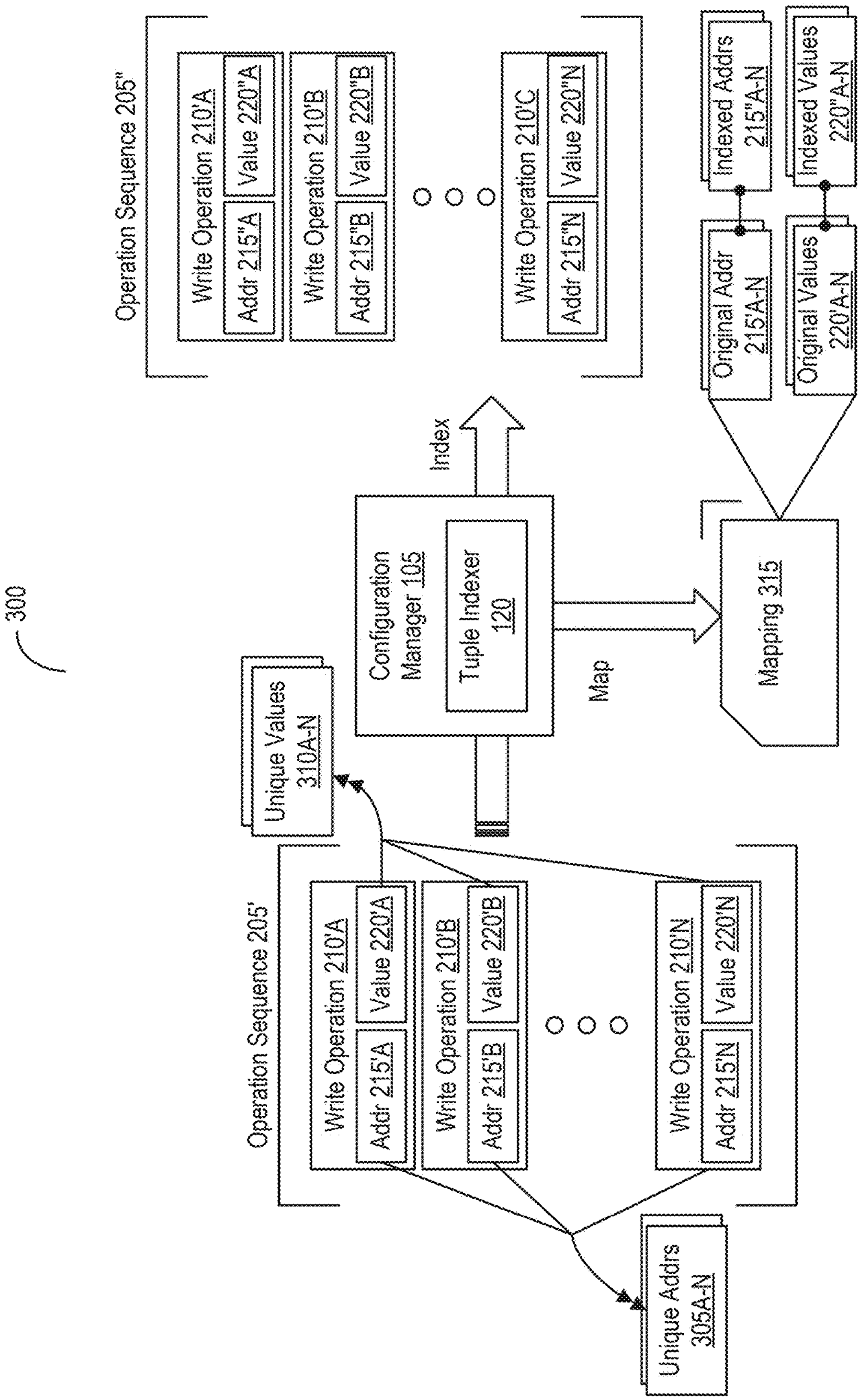
FIG. 3 depicts a block diagram of a process for indexing tuples of operations in the system for configuring devices in accordance with an illustrative embodiment.

Referring now to FIG. 3, depicted is a block diagram of a process 300 for indexing tuples of operations in the system 100 for configuring devices. The process 300 can correspond to or include operations performed in the system 100 to generate index addresses and value to replace original addresses and values in the sequences of operations. Under the process 300, the tuple indexer 120 on the configuration manager 105 can retrieve, obtain, or otherwise identify the sequence operation 205'. The sequence operation 205' can identify or include a set of write operations 210'A-N (hereinafter generally referred to write operations 210'). The set of write operations 210' may correspond to the set of write operations 210 with the reordering or the elision or both from the original operation sequence 205. Each write operation 210' can contain, identify, or otherwise include at least one address 215'A-N (hereinafter generally referred to as address 215') and at least one value 220'A-N (hereinafter generally referred to as value 220'). In some embodiments, the tuple indexer 120 can access storage (e.g., the memory 155 or cache) to fetch or retrieve the operation sequence 205' (or the original sequence 205).

With the identification, the tuple indexer 120 can find, determine, or otherwise one or more unique addresses 305A-N (hereinafter generally referred to as unique addresses 305) from the addresses 215' across the write operations 210' of operation sequence 205'. Each unique address 305 may correspond to or include a different or distinct address 305 among the addresses 215' in the set of write operations 210'. The number of unique addresses 305 may be less than the number of addresses 215' or write operations 210' in the operation sequence 205'. In addition, the tuple indexer can find, determine, or otherwise one or more unique one or more values 310A-N (hereinafter generally referred to as unique values 310) from the values 220' across the write operations 210' of the operation sequence 205'. Each unique value 310 may correspond to or include a different or distinct value 310 among the values 220' in the set of write operations 210'. The number of unique values 310 may be less than the number of values 220' or write operations 210' in the operation sequence 205'.

For each unique address 305, the tuple indexer 120 can calculate, determine, or otherwise generate at least one indexed address 215"A-N (hereinafter generally referred to as an indexed address 215"). The indexed address 215" can be a compressed, lower, or otherwise reduced representation of the corresponding unique address 305. For example, the indexed address 215" can have a lower number of bits (e.g., 16 bits) than a number of bits (e.g., 32 bits) of the corresponding unique address 305. The tuple indexer 120 can generate the indexed address 215" by encoding the unique address 305. In some embodiments, the encoding can be in accordance with a counter (e.g., in 8, 16, 32, or 64, etc. bit counter). For instance, the tuple indexer 120 can traverse through the set of unique addresses 305 using the counter, and use the value of the counter as the indexed address 215".

In addition, the tuple indexer 120 can calculate, determine, or otherwise generate at least one indexed value 215"A-N (hereinafter generally referred to as an indexed value 215") for each unique address 310. The indexed value 220" can be a compressed, lower, or otherwise reduced representation of the corresponding unique value 310. For example, the indexed value 220" can have a lower number of bits (e.g., 16 bits) than a number of bits (e.g., 32 bits) of the corresponding unique value 310. The tuple indexer 120 can generate the indexed value 220" by encoding the unique value 310. In some embodiments, the encoding can be in accordance with a counter (e.g., in 8, 16, 32, or 64, etc. bit counter). For instance, the tuple indexer 120 can traverse through the set of unique addresses 305 using the counter, and use the value of the counter as the indexed value 220".

With the generation of the indexed addresses 215" or indexed values 220" (or both), the tuple indexer 120 can set, replace, or assign the operation sequence 205' to produce, output, or otherwise generate at least operation sequence 205". In generating, the tuple indexer 120 can traverse through the set of write operations 210' in the operation sequence 205'. In each write operation 210', the tuple indexer 120 can assign the address 215' to the indexed address 215" based on the corresponding unique address 305. For example, the unique address 305 corresponding address 215' may be "x101" and the indexed address 215" generated for the unique address 305 may be "011". In this example, the tuple indexer 120 can assign the address 215' in the write operation 210' with "A" corresponding to the indexed address 215". Furthermore, in each write operation 210', the tuple indexer 120 can assign the value 220' to the indexed value 220" based on the corresponding unique address 310. For example, the unique address 310 corresponding value 220' may be "x010" and the indexed value 220" generated for the unique address 310 may be "1011". In this example, the tuple indexer 120 can assign the value 220' in the write operation 210' with "10" corresponding to the indexed value 220".

The operation sequence 205" generated by the tuple indexer 120 can include the set of indexed addresses 215" or the set of indexed value 220", or both, across the set of write operations 210'. In some embodiments, the operation sequence 205' can include the set of indexed addresses 215" and the set of indexed values 220' across the set of write operations 210'. In some embodiments, the operation sequence 205' can include the set of addresses 215' and the set of indexed values 220'" across the set of write operations 210'. In some embodiments, the operation sequence 205' can include the set of indexed addresses 215" and the set of indexed values 220" across the set of write operations 210'. The replacement may be for both or one of the addresses 215' or values 220' in the operation sequence 205' in generating the operation sequence 205".

Using the indexed addresses 215" or indexed values 220" (or both), the tuple indexer 120 can create, write, or otherwise generate at least one mapping 315. The mapping 315 can define, include, or otherwise identify a correspondence between each unique address 305 (and by extension the corresponding address 215') and the indexed address 215". The mapping 315 can define, include, or otherwise identify a correspondence between each unique value 310 (and by extension the corresponding value 215') and the indexed value 220". In some embodiments, the mapping 315 can include correspondences for both addresses and values. In some embodiments, the mapping 315 can include the correspondences for the addresses, without the correspondences for the values. In some embodiments, the mapping 315 can include the correspondences for the values, without the correspondences for the addresses. The mapping 315 can be used for looking up the original address 215' or the original value 220' by the register 170 (or the processor 150) during the execution of the operation sequence 205". The tuple indexer 120 can store and maintain the mapping 315, along with the operation sequence 205", on storage (e.g., the memory 155 and the cache).

Figure 4:
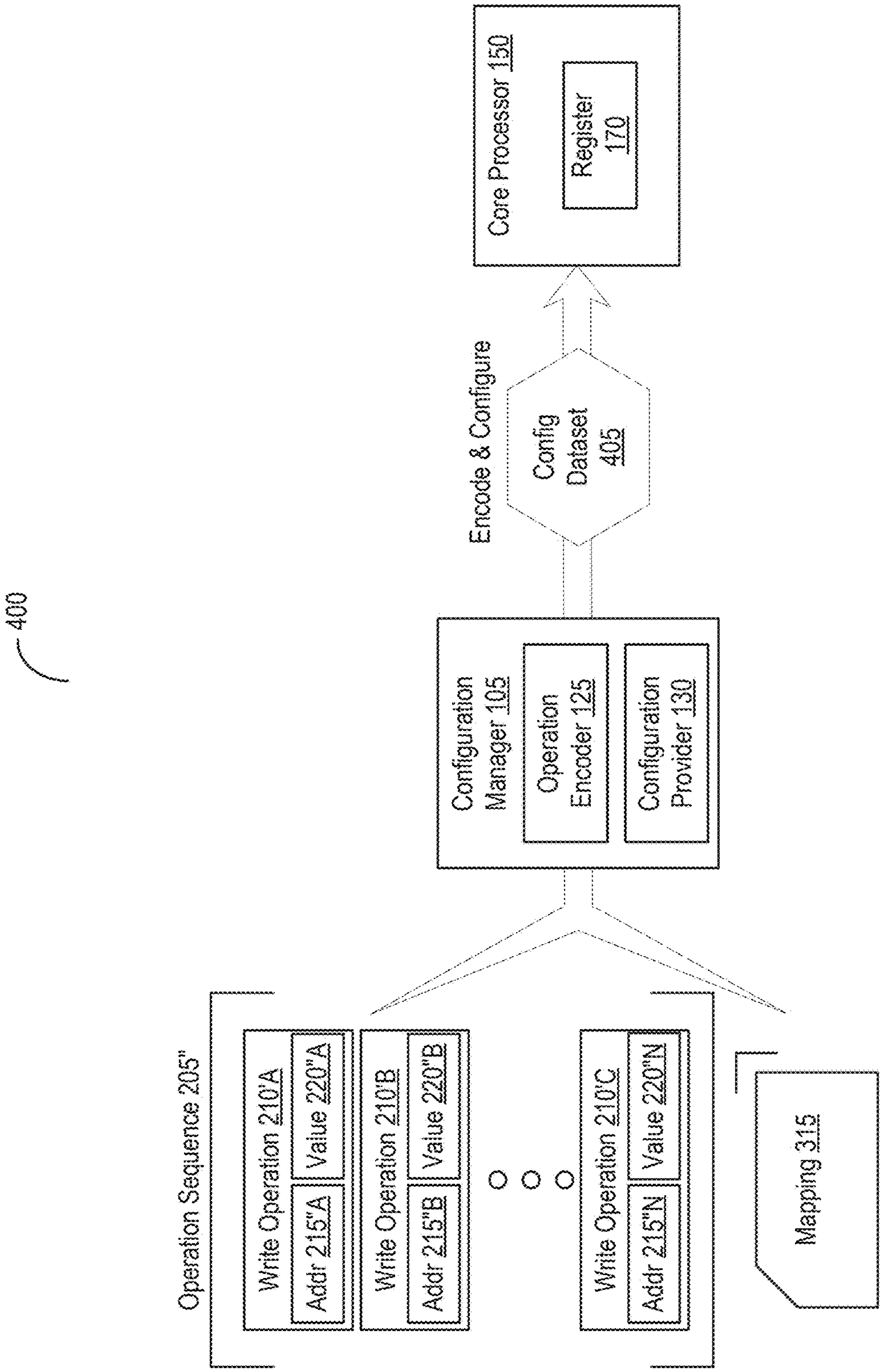
FIG. 4 depicts a block diagram of a progress for loading configuration data onto processors in the system for configuring devices in accordance with an illustrative embodiment.

Referring now to FIG. 4, depicted is a block diagram of a process 400 for loading configuration data onto processors in the system 100 for configuring devices. The process 400 can correspond to or include operations performed in the system 100 to load and configure the register 170 of the processor 150 (or the processor interlock 174) with configuration data. Under the process 400, the operation encoder 125 can carry out, perform, or otherwise apply at least one encoding on the addresses 215" and the values 220" in the operation sequence 205" or the mapping 315, or both. In some embodiments, the operation encoder 125 can apply the encoding the operation sequence 205', with the original addresses 215' and the original values 220' of the write operations 210'. The encoding can include, for example, a variable-length encoding, such as an unsigned little-endian base (ULEB) encoding and Huffman encoding, among others. The encoding may be to further reduce or compress the size or representation (e.g., number of bits) of the addresses 215" and the values 210" of the write operations 210' in the operation sequence 205".

In some embodiments, the operation encoder 125 can apply ULEB encoding to the addresses 215" and the values 220" across the set of write operations 210' of the operation sequence 205". In applying the ULEB encoding to each write operation 210', the operation encoder 125 can extend the number corresponding to the address 215" or the value 220" to a set number of bits (e.g., multiple of 7 bits for ULEB-128). With the extension, the operation encoder 125 can group, partition, or otherwise divide the corresponding number into a group of bits (e.g., 7-bit groups) from least to most significant group to generate the encoded address 215" or value 220".

In some embodiments, the operation encoder 125 can determine or identify whether the addresses 215" or the values 220" (or both) in the write operations 210' are indexed (e.g., generated and assigned by the tuple indexer 120) in applying the ULEB encoding. When the addresses 215" or the values 220" are determined to be indexed, the operation encoder 125 can proceed to apply the ULEB as described above. Otherwise, when the addresses 215" or the values 220" are determined to be not indexed, the operation encoder 125 can reorder the set of operations 210' to be monotonic (e.g., increasing or decreasing). For each write operation 210' subsequent to the first write operation 210' (e.g., the first write operation 210'A), the operation encoder 125 can encode the address 215" or the value 220" as a difference (sometimes herein as a delta) from the address 215" or the value 220" of the previous write operation 210'.

In some embodiments, the operation encoder 125 can apply Huffman encoding to the addresses 215" and the values 220" across the set of write operations 210' of the operation sequence 205". To apply the Huffman encoding, the operation encoder 125 can calculate, identify, or otherwise determine a frequency of each symbol (e.g., the address 215" or value 220" across the set of write operations 210" in the operation sequence 205"). Based on the frequencies, the operation encoder 125 can construct, create, or otherwise a generate a binary tree, with nodes of lower frequencies having higher priority. Using the binary tree, the operation encoder 125 can assign a value (e.g., a binary code) to each node associated with a corresponding symbol. The operation encoder 125 can generate a table from the binary tree, and can generate an encoded code to each symbol based on the table.

The configuration provider 130 can send, convey, or otherwise provide at least one configuration dataset 405 to the core processor 150 to configure the register 170. The configuration data 405 can contain, identify, or otherwise include the operation sequence 205" or the mapping 315, or both, among others. In some embodiments, the configuration provider 130 can send the configuration dataset 405 in the form of a data stream (e.g., a bit stream, a byte stream, or an octet stream, among others) to the core processor 150. The data stream may be continuously provided to the core processor 150 while the configuration manager 105 optimizes (e.g., re-ordering and elision), indexes, and encodes the write operations 210' for the operation sequence 205". In some embodiments, the configuration provider 140 can provide the mapping 315 separately from the write operations 210' of the operation sequence 205". For instance, the configuration provider 140 can provide the mapping 315 ahead of the operation sequence 205" in the data stream to the core processor 150.

The configuration provider 130 can provide the configuration dataset 405 to the processor interlock 174 in a similar manner. The configuration provider 130 can send, convey, or otherwise provide at least one configuration dataset 405 to the processor interlock 174. In some embodiments, the configuration provider 130 can send the configuration dataset 405 in the form of a data stream (e.g., a bit stream, a byte stream, or an octet stream, among others) to the processor interlock 174. In some embodiments, the configuration provider 140 can provide the mapping 315 separately from the write operations 210' of the operation sequence 205" to the processor interlock 174.

Upon configuration, the core processor 150 can carry out, perform, or otherwise execute the set of write operations 210' of the operation sequence 205" using the register 170. During the execution, the core processor 150 can retrieve, obtain, or otherwise load each write operation 210' from the operation sequence 205" on the register 170. From the write operation 210', the core processor 150 can retrieve or identify the address 215" (or the address 215' if not indexed) and the value 220" (or the value 220' if not indexed). When the address 215" or the value 220" are indexed, the core processor 150 can perform a look up on the mapping 315. From the mapping 315, the register 170 can find or identify the correspondence between the indexed address 215" and the original address 215' or the correspondence between the indexed value 220" and the original value 220', or both. Using the correspondence, the core processor 150 can recover, determine, or otherwise identify the original address 215' or value 220' for the write operation 210'. With the identification, the core processor 150 can perform the write operation 210' by writing or storing the value 220' at the location in memory (e.g., the memory 155) referenced by the address 215'.

The processor interlock 174 together with the application processor 172 execute the set of write operations 210' of the operation sequence 205" in a similar manner. The application processor 172 can carry out, perform, or otherwise execute the set of write operations 210' of the operation sequence 205" using the processor interlock 174. During the execution, the core processor 150 can retrieve, obtain, or otherwise load each write operation 210' from the operation sequence 205" on the processor interlock 174. From the write operation 210', the application processor 172 can retrieve or identify the address 215" (or the address 215' if not indexed) and the value 220" (or the value 220' if not indexed). When the address 215" or the value 220" are indexed, the application processor 172 can perform a look up on the mapping 315. From the mapping 315, the processor interlock 174 can find or identify the correspondence between the indexed address 215" and the original address 215' or the correspondence between the indexed value 220" and the original value 220', or both. Using the correspondence, the application processor 172 can recover, determine, or otherwise identify the original address 215' or value 220' for the write operation 210'. With the identification, the application processor 172 can perform the write operation 210' by writing or storing the value 220' at the location in memory (e.g., the memory 155) referenced by the address 215'.

Figure 5:
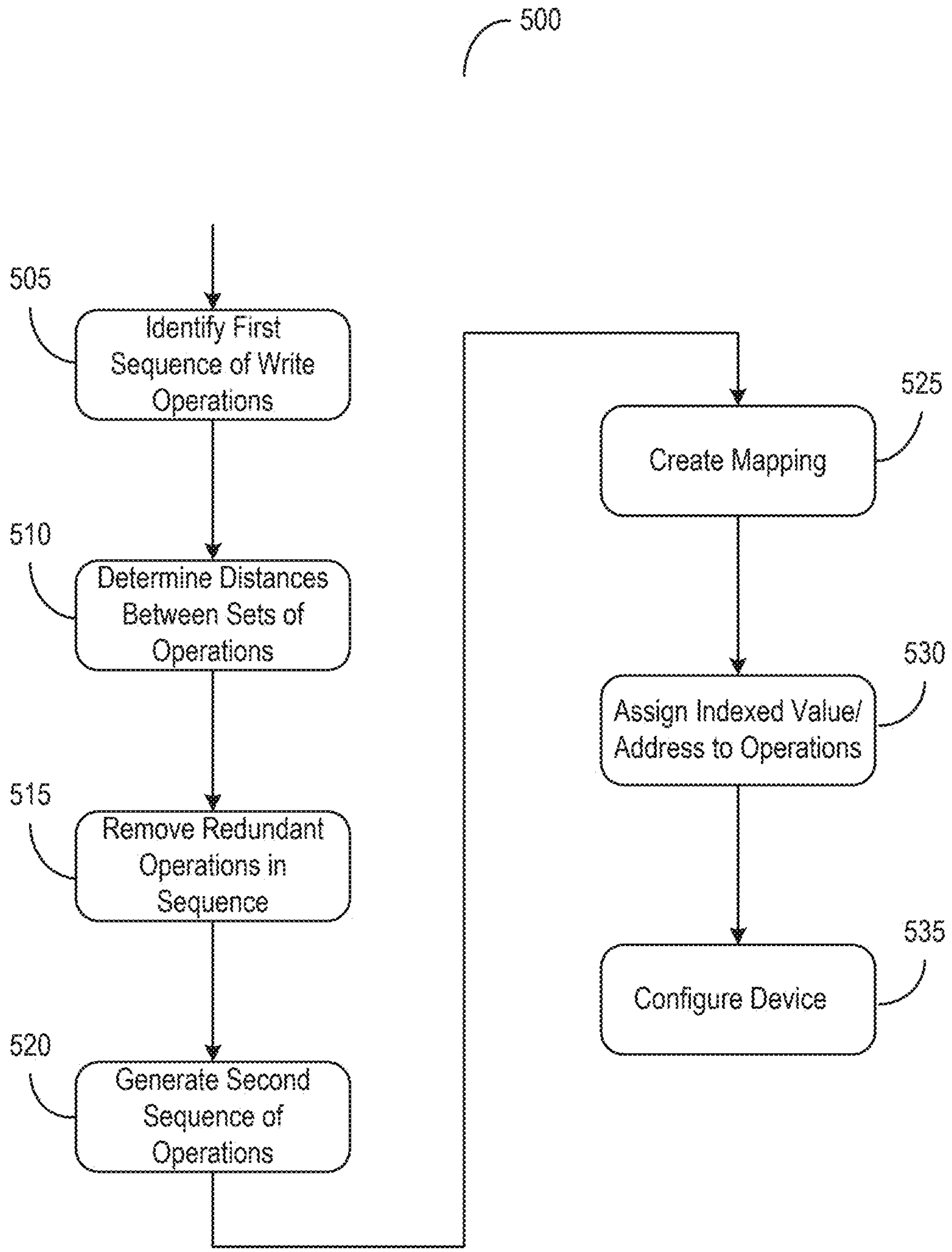
FIG. 5 depicts a flow diagram of a method of configuring devices with write operations in accordance with an illustrative embodiment.

Referring now to FIG. 5, depicted is a flow diagram of a method 500 of configuring devices with write operations. The method 500 can be implemented or performed using any of the components detailed herein, such as the system 100. Under the method 500, one or more processors (e.g., the configuration manager 105) can identify a first sequence of write operations (e.g., the operation sequence 205) (505). The one or more processors can determine distances (e.g., the distances 225) between the sets of operations (e.g., the set of operations 210) (510). The one or more processors can remove redundant operations in the sequence of operations (e.g., the redundancy 230) (515). The one or more processors can generate a second set of operations (e.g., the operation sequence 205') (520). The one or more processors can create a mapping (e.g., the mapping 315) (525). The one or more processors can assign indexed values or addresses (e.g., the indexed values 220" and the indexed addresses 215") to the set of operations (e.g., the set of write operations 210') (530). The one or more processors can configure a device (e.g., the computing device) with the second set of operations (e.g., the operation sequence 205") (535).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture.

The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method, comprising:

obtaining, by one or more processors, a first sequence of write operations to configure a device, each write operation in the first sequence of write operations identifying a set of a first value and a first address to which to write the first value;

identifying, by the one or more processors, a unique address corresponding to the first address across at least a subset of write operations of the first sequence of write operations;

determining, by the one or more processors, a second address based at least on the unique address corresponding to the first address;

assigning, by the one or more processors, the second address to the first address across at least the subset of write operations of the first sequence of write sequences to generate a second sequence of write operations; and causing, by the one or more processors, the device to be configured using the second sequence of write operations.

2. The method of claim 1, further comprising providing, by the one or more processors, a mapping identifying a correspondence between the at least one unique address and the second address to at least one register of the device configured to perform a look up using the mapping during execution of the second sequence of write operations.

3. The method of claim 1, wherein obtaining the first sequence of write operations modifying the first sequence of write operations to minimize one or more distances between the set of the value and the address of a write operation and at least one other set of the value and the address of the one or more other write operations.

4. The method of claim 1, wherein determining the second address further comprises determining, for each unique address of a plurality of unique addresses, a respective second address in accordance with a count of the plurality of unique addresses based at least on the unique address corresponding to a respective first address.

5. The method of claim 1, wherein assigning the second address further comprises assigning, across each subset of write operations in the first sequence of write operations corresponding to a respective unique address, a respective second address of a plurality of second addresses to the first address.

6. The method of claim 1, wherein causing the device to be configured further comprises providing a configuration dataset including the second sequence of write operations including the subset of write operations, each of the subset of write operations identifying the set of the first value and the second address corresponding to the first address.

7. The method of claim 1, further comprising:

identifying, by the one or more processors, a unique value corresponding to the first value across a subset of write operations of the first sequence of write operations;

determining, by the one or more processors, a second value based at least on the unique value corresponding to the first value; and assigning, by the one or more processors, the second value to the first value across at least the subset of write operations of the first sequence of write sequences to include in the second sequence of write operations.

8. The method of claim 7, further comprising providing, by the one or more processors, a mapping identifying a correspondence between the at least one unique value and the second value to at least one register of the device configured to perform a look up using the mapping during execution of the second sequence of write operations.

9. The method of claim 7, wherein determining the second value further comprises determining, for each unique value of a plurality of unique values, a respective second value in accordance with a count of the plurality of unique values.

10. A system, comprising:

one or more processors coupled with memory, configured to:

obtain a first sequence of write operations to configure a device, each write operation in the first sequence of write operations identifying a set of a first value and a first address to which to write the first value;

identify a unique address corresponding to the first address across at least a subset of write operations of the first sequence of write operations;

determine a second address based at least on the unique address corresponding to the first address;

assign the second address to the first address across at least the subset of write operations of the first sequence of write sequences to generate a second sequence of write operations; and cause the device to be configured using the second sequence of write operations.

11. The system of claim 10, wherein the one or more processors are further configured to provide a mapping identifying a correspondence between the at least one unique address and the second address to at least one register of the device configured to perform a look up using the mapping during execution of the second sequence of write operations.

12. The system of claim 10, wherein the one or more processors are further configured to modify the first sequence of write operations to minimize one or more distances between the set of the value and the address of a write operation and at least one other set of the value and the address of the one or more other write operations.

13. The system of claim 10, wherein the one or more processors are further configured to determine, for each unique address of a plurality of unique addresses, a respective second address in accordance with a count of the plurality of unique addresses based at least on the unique address corresponding to a respective first address.

14. The system of claim 10, wherein the one or more processors are further configured to assign, across each subset of write operations in the first sequence of write operations corresponding to a respective unique address, a respective second address of a plurality of second addresses to the first address.

15. The system of claim 10, wherein the one or more processors are further configured to provide a configuration dataset including the second sequence of write operations including the subset of write operations, each of the subset of write operations identifying the set of the first value and the second address corresponding to the first address.

16. The system of claim 10, wherein the one or more processors are further configured to:

identify a unique value corresponding to the first value across a subset of write operations of the first sequence of write operations;

determine a second value based at least on the unique value corresponding to the first value; and assign the second value to the first value across at least the subset of write operations of the first sequence of write sequences to include in the second sequence of write operations.

17. The system of claim 16, wherein the one or more processors are further configured to provide a mapping identifying a correspondence between the at least one unique value and the second value to at least one register of the device configured to perform a look up using the mapping during execution of the second sequence of write operations.

18. A non-transitory computer readable medium storing program instructions for causing one or more processors to:

obtain a first sequence of write operations to configure a device, each write operation in the first sequence of write operations identifying a set of a first value and a first address to which to write the first value;

identify a unique address corresponding to the first address across at least a subset of write operations of the first sequence of write operations;

determine a second address based at least on the unique address corresponding to the first address;

assign the second address to the first address across at least the subset of write operations of the first sequence of write sequences to generate a second sequence of write operations; and cause the device to be configured using the second sequence of write operations.

19. The non-transitory computer readable medium of claim 18, wherein the instructions cause the one or more processors to:

identify a unique value corresponding to the first value across a subset of write operations of the first sequence of write operations;

determine a second value based at least on the unique value corresponding to the first value; and assign the second value to the first value across at least the subset of write operations of the first sequence of write sequences to include in the second sequence of write operations.

20. The non-transitory computer readable medium of claim 18, wherein the instructions cause the one or more processors to provide a mapping identifying a correspondence between the at least one unique address and the second address to at least one register of the device configured to perform a look up using the mapping during execution of the second sequence of write operations.

* * * * *